United States Patent [19]

Schiller et al.

[11] Patent Number: 4,968,760

[45] Date of Patent: Nov. 6, 1990

[54] PAINTABLE ORGANOPOLYSILOXANE COMPOSITIONS WHICH CROSSLINK AT ROOM TEMPERATURE TO FORM ELASTOMERS

[75] Inventors: August Schiller, Neuötting; Norman Dorsch, Burghausen; Werner Graf, Burghausen; Karl Braunsperger, Burghausen, all of Fed. Rep. of Germany

[73] Assignee: Wacker-Chemie GmbH, Munich, Fed. Rep. of Germany

[21] Appl. No.: 318,993

[22] Filed: Mar. 6, 1989

[30] Foreign Application Priority Data

Mar. 11, 1988 [DE] Fed. Rep. of Germany ....... 3808200

[51] Int. Cl.$^5$ ........................................... C08F 283/00
[52] U.S. Cl. ...................................... 525/477; 528/34; 528/33; 528/901
[58] Field of Search ................... 525/477; 528/34, 33, 528/901

[56] References Cited

U.S. PATENT DOCUMENTS 4,191,817  3/1980  Schiller et al. ...................... 528/34
4,490,500 12/1984  Smith ................................. 524/500

Primary Examiner—Melvyn I. Marquis

[57] ABSTRACT

Organopolysiloxane compositions which crosslink at room temperature to form paintable elastomers containing (3) an organopolysiloxane having SiC-bonded radicals with a basic nitrogen and/or (4) a branched organopolysiloxane.

16 Claims, No Drawings

PAINTABLE ORGANOPOLYSILOXANE COMPOSITIONS WHICH CROSSLINK AT ROOM TEMPERATURE TO FORM ELASTOMERS

The present invention relates to organopolysiloxane compositions which crosslink at room temperature to form elastomers, and more particularly to paintable organopolysiloxane compositions which crosslink at room temperature to form elastomers.

BACKGROUND OF THE INVENTION

Organopolysiloxane compositions which can be crosslinked at room temperature to form elastomers have been used heretofore for sealing joints in facade and window construction, in the sanitary field and in industry. However, the use of compositions of this type is limited, if it is necessary, to paint the organopolysiloxane elastomers themselves or the adjacent components since it is very difficult to overcoat organopolysiloxane elastomers.

Heretofore, paintability of organopolysiloxane elastomers have been achieved by applying certain silanes to the crosslinked organopolysiloxanes before overcoating the crosslinked polysiloxanes with paint or by mixing these silanes with the paint just prior to application (German Patent No. 2,852,000) or providing the organopolysiloxane with certain additives before crosslinking (cf., for example, European Patent No. 96,424) or employing dyes containing organosiloxane units as paints (cf., for example, U.S. Pat. No. 4,038,293).

Compared to the previously known solutions to improving the paintability of organopolysiloxane elastomers or providing a means to overcoat organopolysiloxane elastomers, the compositions of this invention have the advantage that it is possible to render a relatively large number of types of crosslinked organopolysiloxanes paintable, i.e., the paintability of the organopolysiloxanes is not limited to a specific crosslinked system. In addition, the crosslinked organopolysiloxanes can be coated directly with a paint, i.e., no additional additives or process steps are necessary, which makes it simple to overcoat the elastomers, and the crosslinked organopolysiloxanes can be overcoated with a relatively large number of types of paints, i.e., it is not necessary to use special-purpose and relatively expensive paints, but instead commercially available paints can be used.

Therefore, it is an object of the present invention to improve the paintability of organopolysiloxane elastomers. Another object of the present invention is to provide a method for overcoating organopolysiloxane elastomers.

SUMMARY OF THE INVENTION

The foregoing objects and others which will become apparent from the following description are accomplished in accordance with this invention, generally speaking, by providing one-component or two-component compositions which crosslink at room temperature to form elastomers which contain diorganopolysiloxanes (1) and at least one additional organopolysiloxane selected from (3) an organopolysiloxane which contains SiC-bonded organic radicals having a basic nitrogen and is prepared by reacting, in a first step, a silane of the formula $$YSiR_x(OR^1)_{3-x},$$

in which R represents the same or different, monovalent hydrocarbon radicals and substituted monovalent hydrocarbon radicals having 1 to 18 carbon atoms per radical, $R^1$ represents the same or different alkyl radicals having from 1 to 4 carbon atoms per radical, Y represents a monovalent, SiC-bonded organic radical having a basic nitrogen, and x is 0 or 1, or a partial hydrolyzate of a silane of this type, or a silane of this type and a partial hydrolyzate of a silane of this type with an organopolysiloxane of the formula $$R_3SiO(SiR_2O)_nSiR_3$$

in which R is the same as above, and n is 0 or an integer having a value of from 1 to 100, in an amount of from 0.1 to 10 parts by weight per part by weight based on the total amount of the silane of the above formula and the partial hydrolyzate of the silane of this type, in the presence of a basic catalyst and in the absence of water, and in a second step, reacting the organopolysiloxane obtained in the first step with water in order to hydrolyze groups of the formula $$-OR^1,$$

in which $R^1$ is the same as above, while simultaneously or subsequently condensing the silanol groups formed during this hydrolysis with one another, and freeing the product formed during this reaction from alkanol and water, and/or (4) a branched organopolysiloxane which comprises 0 to 50 mol percent of $R_3SiO_{\frac{1}{2}}$ units,
0 to 80 mol percent of $R_2SiO$ units,
10 to 60 mole percent of $RSiO_{3/2}$ units, and
0 to 10 mol percent of $SiO_2$ units, where R is the same as above, and where this branched organopolysiloxane contains from 0 to 10 mole percent of SiOC-bonded groups of the formula $-OR^2$ in which $R^2$ represents monovalent hydrocarbon radicals having from 1 to 8 carbon atoms per radical and optionally substituted by an alkoxy group, and a maximum of from 0.5 mol percent of Si-bonded hydroxyl groups. Preferably the organopolysiloxane compositions contain components (3) and (4).

In addition, the invention also relates to a method for preparing single-component or two-component compositions which crosslink at room temperature to form paintable or overcoatable elastomers which comprises adding organopolysiloxane (3) containing SiC-bonded organic radicals having a basic nitrogen and/or a branched organopolysiloxane (4) to single-component or two-component compositions which crosslink at room temperature to form paintable or overcoatable elastomers that are based on diorganopolysiloxanes (1).

DESCRIPTION OF THE INVENTION

Organopolysiloxanes containing SiC-bonded organic radicals having a basic nitrogen are described in U.S. Pat. No. 4,191,817 to Bosch et al as a component of organopolysiloxane compositions which have a long shelf life in the absence of water, but crosslink at room temperature in the presence of water to form elastomers. Although they improve the adhesion of elastomers produced from such compositions on substrates on which the elastomers have been produced, they do not improve the adhesion of paints applied to elastomers made from such compositions.

The use of branched organopolysiloxanes as plasticizers in organopolysiloxane compositions which have a long shelf life in the absence of water, but crosslink at room temperature in the presence of water to form elastomers are described in U.S. Patent Application Serial No. 349,537 to Beers. It could not have been predicted that they improve the paint-compatibility of such compositions.

Paint-compatibility is described as that property of a movement-accommodating sealant which permits a visually flawless overlap of a maximum of 2 mm with a paint on the sealant in the peripheral region of a joint without harmful interactions occurring between the sealant, the paint and/or the adjoining components.

In contrast, paintability is described as the property of being possible to apply one or more paint coats covering the entire surface of a movement-accommodating sealant without harmful interactions of a functional and visual type occurring.

A paint coat is regarded as being functionally and visually flawless when it:

Flows out without defects, i.e., exhibits no fish eyes, wetting defects, or pits;
hardens to form a non-tacky surface;
adheres flawlessly to the substrate;
does not discolor; and
exhibits no wrinkling in the hardened film.

In addition to the organopolysiloxane (3) used according to this invention and containing SiC-bonded organic radicals having a basic nitrogen and/or branched organopolysiloxane (4), the compositions which crosslink according to this invention at room temperature to form elastomers are based on diorganopolysiloxanes containing the same components in the same amounts as have been, or could have been used heretofore, in compositions which crosslink at room temperature to form elastomers that are based on diorganopolysiloxanes which did not contain the organopolysiloxane (3) of this invention having SiC-bonded organic radicals with a basic nitrogen and/or did not contain the branched organopolysiloxane (4) used in this invention.

Such compositions are described, for example, in U.S. Pat. No. 4,191,817, in EP-OS 253,377 (laid open Jan. 20, 1988, E. Bosch et al, Wacker-Chemie GmbH), and in U.S. Pat. No. 4,490,500 to Smith.

The compositions of this invention, which are based on diorganopolysiloxanes, crosslink at room temperature to form elastomers. The crosslinking of the compositions preferably takes place by means of condensation in a known manner. These compositions are known as the so-called one-component, or so-called two-component systems.

Compositions which crosslink at room temperature to form elastomers and contain the additives (3) and/or (4) of this invention are preferably those comprising:

(1) A diorganopolysiloxane containing end groups which are capable of condensation;

(2) a silicon compound having a total of at least three amino groups bonded to silicon by nitrogen and/or oxime groups bonded to silicon via oxygen and/or optionally substituted hydrocarbonoxy groups bonded to silicon via oxygen per molecule, and if appropriate, at least one additional substance.

Examples of organopolysiloxane compositions which contain the additive (3) and/or (4) of this invention are preferably those compositions containing diorganopolysiloxanes which have a long shelf life in the absence of water, but crosslink or cure at room temperature in the presence of water to form elastomers. These are the so-called one-component systems which form elastomers that are used, for example, as sealants for wooden windows or joints on ship decks, which are themselves or the adjoining components coated with paints.

Particularly preferred compositions which crosslink at room temperature to form elastomers and contain the additives (3) and/or (4) of this invention are the single-component compositions which have a long shelf life in the absence of water, but crosslink at room temperature in the presence of water to form elastomers. These compositions have been prepared by mixing:

(1) A diorganopolysiloxane containing an end group which is capable of condensation with (2) a silicon compound having a total of at least three amino groups bonded to silicon via nitrogen and/or oxime groups bonded to silicon via oxygen and/or optionally substituted hydrocarbonoxy groups bonded to silicon via oxygen per molecule, and if appropriate at least one additional substance.

The diorganopolysiloxanes (1) containing end groups which are capable of condensation and which are usually used in preparation of such compositions can be represented by, for example, the general formula

$$HO(SiR^3{}_2O)_mH. \qquad (1)$$

In this formula, $R^3$ represents the same or different, monovalent hydrocarbon radicals and substituted monovalent hydrocarbon radicals, preferably having from 1 to 18 carbon atoms per radical and m represents an integer having a value of at least 10.

In addition to the diorganosiloxane units ($SiR^3{}_2O$), other siloxane units can be present within or along the siloxane chains having the above formula, although they are not shown in formulas of this type. Examples of other siloxane units of this type, which are usually present merely as impurities, are those of the formulas $R^3SiO_{3/2}$, $R^3{}_3SiO_{\frac{1}{2}}$ and $SiO_{4/2}$, where $R^3$ is the same as above. However, the amount of siloxane units of this type other than diorganosiloxane units is preferably, at most, about 10 mole percent, preferably not more than about 1 mole percent, based on the weight of the diorganopolysiloxanes (1).

Examples of hydrocarbon radicals represented by $R^3$ are alkyl radicals, such as methyl, ethyl, n-propyl, isopropyl and octadecyl radicals; alkenyl radicals, such as the vinyl and allyl radicals; cycloaliphatic hydrocarbon radicals, such as the cyclopentyl, cyclohexyl, methylcyclohexyl and cyclohexenyl radicals; aryl radicals, such as the phenyl radical and xenyl radicals; aralkyl radicals, such as the benzyl, α-phenylethyl and α-phenylpropyl radicals; and alkaryl radicals, such as the tolyl radicals.

The hydrocarbon radicals represented by $R^3$ may be substituted, in particular halogenated, such as 3,3,3-trifluoropropyl, chlorophenyl and bromotolyl radicals. Further examples of organic radicals represented by $R^3$ are cyanoalkyl radicals, such as the α-cyanoethyl radical.

The organopolysiloxanes having one Si-bonded hydroxyl group in each of the terminal units can be mixed with polymers, produced in their presence by polymerization or copolymerization by means of free radicals, made from compounds which can be polymerized by addition polymerization, such as styrene, vinyl acetate, acrylic acid, methacrylic acid, acrylates, methacrylates or acrylonitrile, or a mixture of at least two polymerizable compounds of this type, such as a mixture of styrene and n-butyl acrylate. All of these polymers need not be present as mixtures with the diorganopolysiloxanes, but they can be grafted onto the diorganopolysiloxane, at least to a minor extent.

It is preferred that a majority of the radicals represented by $R^3$ (so long as no polymer is grafted thereto) be methyl radicals, because of their availability. The other radicals represented by $R^3$ which are optionally present are, in particular, vinyl radicals or phenyl radicals or vinyl and phenyl radicals.

The viscosity of the organopolysiloxanes to be crosslinked is preferably 100 to 500,000 mPa.s at 25° C.

Examples of silicon compounds (2) which can be used in the single-component systems are preferably silanes of the general formula $$R^3{}_a SiZ_{4-a},\qquad(2a)$$

in which $R^3$ is the same as above, a is 0 or 1 and Z represents the same or different hydrolyzable groups, such as amino groups ($-NR^4{}_2$), oxime groups ($-ON=CR^4{}_2$) and optionally substituted hydrocarbonoxy groups ($-OR^2$), and partial hydrolyzates thereof containing from 2 to 10 silicon atoms per molecule. In these formulas, $R^4$ represents hydrogen or the same or different monovalent hydrocarbon radicals or substituted monovalent hydrocarbon radicals having from 1 to 18 carbon atoms per radical, and $R^2$ is the same as above.

The examples mentioned of substituted and unsubstituted hydrocarbon radicals represented by $R^3$ also apply, except for the vinyl radical, to the substituted and unsubstituted hydrocarbon radicals represented by $R^4$.

Examples of amino groups are the n-butylamino, secbutylamino and cyclohexylamino groups.

Examples of oxime groups are the acetaldoxime, acetone oxime and 2-butanone oxime groups.

Additional examples of silicon compounds (2) which can be used in this invention in single-component systems are preferably silanes of the general formula (2b) $R^5Si(OR^2)_3$, (2b)

where $R^2$ is the same as above and $R^5$ represents amino, mercapto, morpholino, glycidoxy, acryloxy and methacryloxy groups which are connected to the silicon atom via $C_2$- to $C_6$-alkylene radicals, where the amino and mercapto groups may be substituted by $C_1$- to $C_6$-alkyl, cycloalkyl, aminoalkyl and mercaptoalkyl groups.

Examples of alkyl radicals represented by $R^2$ are the methyl, ethyl, n-propyl, isopropyl, n-butyl, sec-butyl and the tert-butyl radicals, in which the methyl and the ethyl radicals are preferred. Examples of hydrocarbon radicals represented by $R^2$ which are substituted by an alkoxy group are the methoxy-ethyleneoxy, the ethoxyethyleneoxy and the methoxyisopropyleneoxy radicals.

Examples of preferred radicals represented by $R^5$ are the β-aminoethyl-gamma-aminopropyl radical, the 3-mercaptopropyl radical, the 3-aminopropyl radical, the 3-(N-cyclohexyl-)aminopropyl radical, the 3-methacryloxypropyl radical, the 3-acryloxypropyl radical, the 3-morpholinopropyl radical, the 3-(N-methyl-)aminopropyl radical and the glycidoxypropyl radical.

Examples of silanes of formula (2b) are methacryloxypropyltrimethoxysilane, glycidoxypropyltriethoxysilane, mercaptopropyltrimethoxysilane, β-aminoethyl-gamma-aminopropyltrimethoxysilane, and β-aminoethyl-gamma-aminopropyltriethoxysilane.

Further examples of silicon compounds (2) which can be used in this invention in single-component systems are preferably silanes of the formula

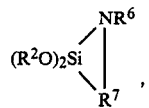

where $R^2$ is the same as above, $R^6$ represents a hydrogen atom or an alkyl, cycloalkyl, aminoalkyl or mercaptoalkyl group, in each case having from 1 to 6 carbon atoms, and $R^7$ represents a divalent aliphatic hydrocarbon radical having from 1 to 10 carbon atoms per radical. A preferred radical represented by $R^7$ is a radical of the formula $-(CH_2)_3-$.

Examples of silanes of formula (2c) are those of the formulas

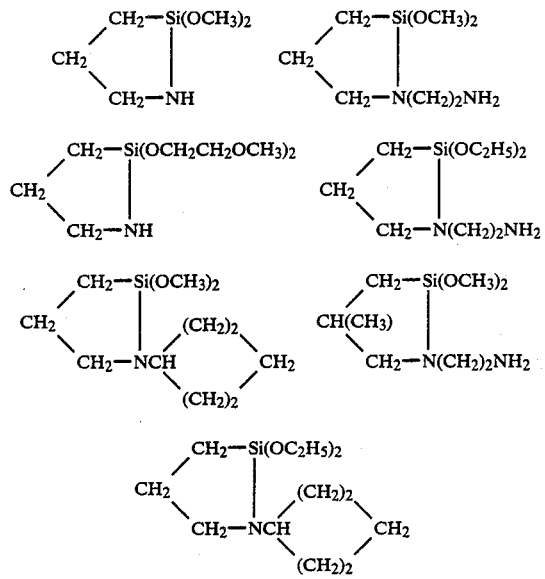

Further examples of organopolysiloxane compositions which contain the additives (3) and/or (4) of this invention are preferably two-component compositions which crosslink at room temperature to form elastomers. In these compositions, component (A) preferably contains, as crosslinking diorganopolysiloxanes, diorganopolysiloxanes (1) having end groups which are capable of condensation, and component (B) preferably containing, as crosslinking agent, silicon compounds (2d) having a total of at least three optionally substituted hydrocarbonoxy groups bonded to silicon via oxygen per molecule, and the two components optionally containing at least one additional substance.

Preferred crosslinking diorganopolysiloxanes (1) are the abovementioned diorganopolysiloxanes of formula (1).

Preferred silicon compounds (2d) are those of the formula $$R^3{}_a Si(OR^2)_{4-a},\qquad(2)$$

where a, $R^2$ and $R^3$ are the same as above, or oligomers thereof.

The preparation of the organopolysiloxanes (3) employed according to this invention and containing SiC-bonded organic radicals having a basic nitrogen is described in U.S. Patent Application Serial No. 07/117,000, Gamon et al, filed on Nov. 5, 1987. These organopolysiloxanes, which preferably contain units of the formula $R_3SiO_{\frac{1}{2}}$, $R_2SiO$ and $YSiR_xO_{3-x/2}$, where R and Y are the same as above, and x is 0 or 1, contain, due to their method of preparation, very few groups, such as silanol groups, which are capable of condensation. The organopolysiloxanes (3) employed according to this invention and containing SiC-bonded organic radicals having a basic nitrogen or the organopolysiloxane compositions which crosslink at room temperature to form elastomers and contain these organopolysiloxanes thereby have a particularly long shelf life.

Organopolysiloxanes (3) containing SiC-bonded organic radicals with a basic nitrogen, preferably have an amine number (=number of ml of 1 N HCl necessary to neutralize 1 g of substance) of, from 1 to 10, and more preferably from 2 to 7, and a viscosity of, preferably from 10 to 5,000 mm$^2$/s, and more preferably from 50 to 2,500mm$^2$/s, at 25° C. are preferably employed. The equivalent weights of these organopolysiloxanes are preferably between 100 and 1,000, and more preferably between 140 and 500. In organopolysiloxanes (3), the ratio between the siloxane units containing SiC-bonded organic radicals having a basic nitrogen, i.e., units of the formula $YSiR_xO_3-/2$ and the diorganosiloxane units, i.e., units of the formula $R_2SiO$ where R, Y and x are the same as above, is preferably from 1:1 to 1:25, and mOre preferably from 1:1 to 1:10.

Examples of hydrocarbon radicals represented by R having from 1 to 18 carbon atoms are the methyl, ethyl, n-propyl, isopropyl, butyl, octyl, tetradecyl and octadecyl radicals; radicals having an aliphatic multiple bond and composed of carbon and hydrogen atoms, such as the vinyl and allyl radicals and hexenyl radicals; cycloaliphatic hydrocarbon radicals, such as the cyclopentyl, cyclohexyl, methylcyclohexyl radicals; aromatic hydrocarbon radicals, such as the phenyl and xenyl radicals; alkaryl radicals, such as the tolyl radicals; and aralkyl radicals, such as the benzyl radical. The hydrocarbon radicals R may also represent fluorinated hydrocarbon radicals such as the 3,3,3-trifluoropropyl radical.

Examples of alkyl radicals represented by $R^1$ are the methyl, ethyl, n-propyl, isopropyl, n-butyl, sec-butyl and the tert-butyl radicals, in which the methyl and the ethyl radicals are preferred.

The monovalent, SiC-bonded organic radicals having a basic nitrogen, i.e., the radicals Y, are preferably those of the formula
$R^8_2NR^9—$, in which $R^8$ represents hydrogen or the same or different alkyl or cycloalkyl or aminoalkyl radicals and $R^9$ represents a divalent hydrocarbon radical which is free from aliphatic multiple bonds and has one carbon atom or 2 to 4 carbon atoms per radical, in particular a radical of the formula $—(CH_2)_3—$.

The examples of alkyl radicals represented by R are also applicable to alkyl radicals represented by $R^8$.

Examples of aminoalkyl radicals represented by $R^8$ are those of the formula $H_2N(CH_2)_3—$ $H_2N(CH_2)_2NH(CH_2)_3—$ $H_2N(CH_2)_2—$ $(H_3C)_2N(CH_2)_2—$ $H_2N(CH_2)_4—$ $H(NHCH_2CH_2)_3—$ and $C_4H_9NHCH_2CH_2NH(CH_2)_2—$.

An example of a cycloalkyl radical represented by $R^8$ is the cyclohexyl radical.

The monovalent, SiC-bonded radicals having a basic nitrogen, i.e., the radicals Y, may, however, also be, for example, those of the formula

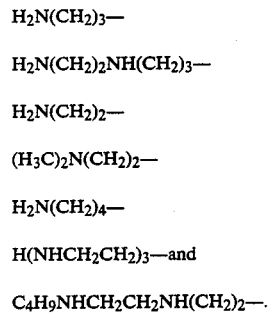

where $R^9$ is the same as above.

Silanes of the formula $YSi(CH_3)_x(OR^1)_{3-x}$, where Y, $R^1$ and x are the same as above are preferably employed.

Individual examples of silanes of the formula $YSiR_x(OR^1)_{3-x}$, which can be employed in the first step of the process in the preparation of the organopolysiloxanes (3) are those of the formula $H_2N(CH_2)_3Si(CH_3)(OC_2H_5)_2$ $H_2N(CH_2)_2NH(CH_2)_3Si(CH_3)(OCH_3)_2$

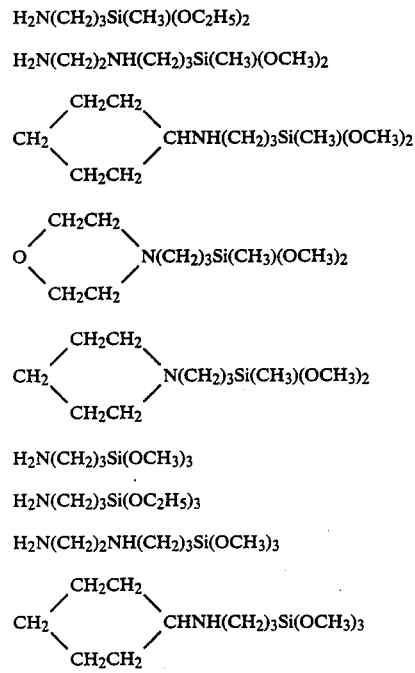

$H_2N(CH_2)_3Si(OCH_3)_3$ $H_2N(CH_2)_3Si(OC_2H_5)_3$ $H_2N(CH_2)_2NH(CH_2)_3Si(OCH_3)_3$

-continued

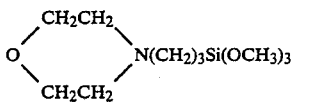

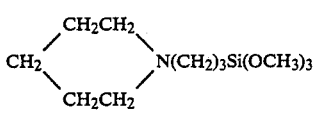

An example of a partial hydrolyzate of a silane of this type is a disiloxane of the formula

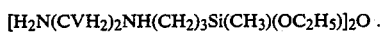

Basic catalysts which can be employed in the first step in the preparation of the organopolysiloxanes (3) employed in this invention and containing SiC-bonded organic radicals having a basic nitrogen are any basic catalysts which promote the equilibration of mixtures of organosilicon compounds containing SiC-bonded organic radicals having a basic nitrogen and organo(poly)siloxanes free of such radicals. Examples of catalysts of this type are alkali metal hydrides, alkali metal hydroxides, alkali metal silanolates, alkali metal siloxanolates, quaternary ammonium hydroxides, quaternary ammonium silanolates, quaternary ammonium siloxanolates, quaternary phosphonium hydroxides, quaternary phosphonium silanolates, quaternary phosphonium siloxanolates, alkali mertal alkyls, alkali metal alkenyls, alkali metal aryls, base-activated montmorillonites and basic ion exchange resins. Specific examples of basic catalysts of this type are sodium hydroxide, potassium hydroxide, caesium hydroxide, potassium methylsilanolate, tetra-n-butylphosphonium hydroxide, products from the reaction of tetra-methylammonium hydroxide and octamethylcyclotetrasiloxane, tetramethylammonium hydroxide, benzyltrimethylammonium hydroxide, naphthalenepotassium, n-butyllithium and amylsodium.

Branched organopolysiloxanes (4) which are preferably employed are those which are liquid at room temperature and have a viscosity of, preferably, from 8 to 200, and more preferably from 12 to 40 mm$^2$/s at 23° C.

The branched organopolysiloxanes are prepared in a known manner by hydrolyzing the corresponding chlorosilanes or alkoxysilanes or by coequilibration of suitable siloxanes. After hydrolysis, the Si-bonded hydroxyl content of the polymer must be reduced by condensation, if appropriate, with addition of catalysts, to a maximum content of about 0.5 percent. By carrying out the process in a suitable way, preferably by adding solvents, the viscosity of the final branched organopolysiloxane must be kept from increasing above 200 mm2/s at 23° C. during the condensation and during the preparation by equilibration of suitable organopolysiloxanes.

It is possible to employ one type of organopolysiloxane (3) or a mixture of at least two different types of organopolysiloxanes (3) in the compositions of this invention.

It is, likewise, possible to employ one type of branched organopolysiloxane (4) or a mixture of at least two different types of organopolysiloxanes (4) in the compositions of this invention.

The organopolysiloxanes (3) are preferably present in the compositions of this invention in an amount of from 0.1 to 20 percent by weight, and more preferably from 0.5 to 5 percent by weight, based on the total weight of the composition.

The branched organopolysiloxanes (4) are preferably present in the compositions of this invention in an amount of from 1 to 30 percent by weight, and more preferably form 5 to 20 percent by weight, based on the total weight of the composition.

Particularly good results are obtained if the compositions of this invention contain both additives (3) and (4). The compositions of this invention preferably contain the organopolysiloxane (3) and the branched organopolysiloxane (4) or the organopolysiloxane (3) and the branched organopolysiloxane (4) are added to the compositions of this invention.

Paint-compatible respectively paintable elastomers can also be obtained if only one of the two additives, the organopolysiloxane (3) or the branched organopolysiloxane (4), is present in the compositions or is added to the compositions of this invention.

An example of additional substances, other than the substances (1), (2), (2a) to (2d), (3) and (4), which are preferably used concomitantly in the preparation of the compositions of this invention are plasticizers, such as linear organopolysiloxanes containing triorganosiloxy groups as terminal units, or plasticizers based on hydrocarbons, such as described, for example, in DE-AS 2,364,856, DE-AS 2,802,170, DE-AS 2,908,036, DE-OS 3,323,911, DE-OS 3,329,877, German Patent No. 3,342,026 and German Patent No. 3,342,027.

Linear organopolysiloxanes containing triorganosiloxy groups as terminal units are preferably used concomitantly in maximum amounts of about 10 percent by weight, based on the total weight of the composition. In contrast to the branched organopolysiloxanes (4), linear organopolysiloxanes containing triorganosiloxy groups as terminal units are highly repellent to paints containing aqueous or organic solvents, which means that paints have poor flow and poor adhesion on elastomers containing these linear organopolysiloxanes as plasticizers. The plasticizers based on hydrocarbons have greater volatility compared with the branched organopolysiloxanes (4), i.e., they evaporate out of the elastomers, and in addition, are frequently not very UV-stable, which can result in a yellowing of the elastomers.

Compositions which contain the organopolysiloxane (3), but not the branched organopolysiloxane (4), give elastomers which have paint compatibility. Since the hydrocarbon plasticizers, and the above mentioned linear organopolysiloxanes containing terminal triorganosiloxy units, can only be used in small amounts; the resultant elastomers have a hard-elastic property profile, i.e., the elastomers have a high residual stress on elongation, which is undesirable for the compositions of this invention in many applications, such as sealants.

Compositions which contain the branched organopolysiloxane (4), but not the organopolysiloxane (3), provide elastomers which have compatibility with paints, i.e., the paints flow extremely well on elastomers of this type, but the adhesion of the paints to the elastomers is usually very poor.

In addition to the substances mentioned above, the organopolysiloxane compositions of this invention can contain additional substances which are known per se.

Additional substances which can preferably be employed in the preparation of the compositions of this invention are condensation catalysts, reinforcing fillers, non-reinforcing fillers, pigments, soluble dyes, fragrances, fungicides, purely organic resins, such as homopolymers or copolymers of acrylonitrile, styrene, vinyl chloride or propylene, it being possible for purely organic resins of this type, and in particular, copolymers of styrene and n-butyl acrylate, in which the copolymers have been produced from the polymerization of the monomers by means of free radicals in the presence of diorganopolysiloxanes containing one Si-bonded hydroxyl group in each of the terminal units, corrosion inhibitors, polyglycols, which may be esterified and/or etherified, oxidation inhibitors, heat stabilizers, solvents, agents for affecting the electrical properties, such as conductive carbon black, flame repellents, light screens and agents for extending the skin-formation time, such as silanes containing SiC-bonded mercaptoalkyl radicals, and also blowing agents, for example, azodicarboxamide.

Similarly, silanes of the formula

in which $R^2$ and $R^3$ are the same as above and b is 0 or 1, or partial hydrolyzates thereof, such as hexamethoxydisiloxane, which crosslink with the elimination of alcohols are preferably used in the single component organopolysiloxane compositions of this invention. In order to improve shelf life of compositions of this type, salts of metals from the 2nd main group and sub-group of the periodic table with branched carboxylic acids having 5 to 15 carbon atoms, as described in U.S. Patent Application Serial No. 07/293,909, filed on Jan. 6, 1989, can preferably be used in the single-component organopolysiloxane compositions of this invention.

Similarly, it is possible to use agents for improving the adhesion of the elastomers prepared from the compositions of this invention to the substrates on which the elastomers have been produced, preferably amino-functional silanes, such as, for example, gamma-aminopropyltriethoxysilane and N-(2-aminoethyl)-3-aminopropyltriethoxysilane, and the organopolysiloxanes containing SiC-bonded radicals having a basic nitrogen mentioned in U. S. Patent No. 4,191,817 to Bosch et al.

Condensation catalysts are preferably employed. Examples of condensation catalysts are butyl titanates and organotin compounds, such as di-n-butyltin diacetate, di-n-butyltin dilaurate and products obtained from the reaction of a silane containing, as hydrolyzable groups, at least two monovalent hydrocarbon radicals which are optionally substituted by an alkoxy group and are bonded to silicon via oxygen per molecule, or oligomers thereof with diorganotin diacylate, or the valences of the tin atoms being saturated in these reaction products by oxygen atoms of the formula

or by SnC-bonded monovalent organic radicals. The preparation of reaction products of this type is described in U.S. Pat. No. 4,460,761 to Schiller et al.

The compositions of this invention preferably contain fillers. Examples of fillers are non-reinforcing fillers, i.e., fillers having a BET surface area of up to 50 $m^2/g$, such as quartz, diatomaceous earth, calcium silicate, zirconium silicate, zeolites, metal oxide powders, such as aluminum oxide, titanium oxide, iron oxide or zinc oxide or the mixed oxides thereof, barium sulphate, calcium carbonate, gypsum, silicon nitride, silicon carbide, boron nitride, glass powder and plastic powder, such as polyacrylonitrile powder; reinforcing fillers, i.e., fillers having a BET surface area greater than 50 $m^2/g$, such as pyrogenically prepared silica, precipitated silica, carbon black, such as furnace black and acetylene black, and silicon/aluminum mixed oxides of large BET surface area; fibrous fillers, such as asbestos and plastic fibers. The fillers may be rendered hydrophobic, for example, by treatment with organosilanes or organosiloxanes or with stearic acid or by etherification of hydroxyl groups to give alkoxy groups. It is possible to employ one type of filler; however, it is also possible to employ a mixture of at least two fillers.

In order to prepare the single-component compositions of this invention, all components of the particular single-component composition are mixed with one another in any desired sequence. This mixing is preferably carried out at room temperature. If desired, however, this mixing can also be carried out at elevated temperatures, for example, at temperatures in the range of from 35° C. to 135° C. During this mixing, the presence of water is preferably excluded as much as possible.

The water content of air is generally sufficient for crosslinking the single component compositions of this invention. If desired, the crosslinking can also be carried out at room temperature or at temperatures above or below room temperature, for example, at −5° C. to 10° C. or at 30° C. to 50° C.

In order to prepare the two-component compositions of this invention, component A is preferably prepared by mixing components (3) and/or (4) of this invention with diorganopolysiloxanes (1), and if appropriate, with the additional substances mentioned heretofore, such as fillers, and in the preparation of component (B), the crosslinking agent, the silicon compound (2d), and at least one other substance such as mentioned heretofore, for example, condensation catalysts, adhesion promoters and fillers, are mixed together. The two-component composition is crosslinked by mixing component (A) with component (B).

The paints used in this invention can be surface coatings, aqueous dispersions or lacquers, for example, those based on alkyd resins, polyurethane or starting materials for polyurethane, nitrocellulose, epoxides, polyesters or poly(vinyl chloride) or copolymers of poly(vinyl chloride), which are usually dissolved in an organic solvent, or those based on acrylic resins, poly(vinyl acetate) or a copolymer of poly(vinyl acetate) and/or styrene, such as poly(styrene acetate), which are usually employed as aqueous dispersions.

The compositions of this invention can be employed for all purposes for which compositions which crosslink at room temperature to form elastomers can be employed, and where it is necessary, coat the crosslinked compositions themselves or the materials adjoining the crosslinked compositions with paints.

The compositions of this invention are thus highly suitable, for example, as sealant compositions for joints, including vertical joints, and similar spaces of internal width, for example, from 10 to 40 mm, for example, buildings, land, water and air vessels, or as adhesives or sealants for example, in window construction or in the production of aquaria or cabinets, and also, for example, in the production of protective coatings, including those for surfaces exposed to the constant action of fresh or sea water, or antislip coatings, or for rubber-elastic moldings, and for the insulation of electrical or electronic equipment.

In the following examples, all parts and percentages are by weight, unless otherwise specified.

In these examples, a non-sagging paste means that the paste emerges from a vertical with U 26 profile (internal width 26 mm, depth 18 mm) by not more than 2mm when tested in accordance with DIN (Deutsche Industrie Norm) 52454.

Also, in these examples, the Shore A hardness is determined in accordance with DIN (Deutsche Industrie Norm) 53505, and the tear strength, elongation at break and the stress at 100 percent elongation are determined in accordance with DIN 53504 using a S 3A standard bar.

EXAMPLE 1

(a) A mixture containing 222 parts of N-(2-aminoethyl)-3-aminopropyltrimethoxysilane, i.e., a silane of the formula

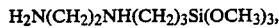

444 parts of dimethylpolysiloxane which is end-blocked by trimethylsiloxy groups and contains an average of 10 siloxane units per molecule, and 1 part of a 40 percent solution of tetramethylammonium hydroxide in methanol is stirred at 80° C. for 1 hour under dry nitrogen.

About 175 parts of distilled water are then added and the mixture is stirred for an additional 2 hours at 80° C., during which some of the methanol distills off. A vacuum is then applied, and methanol and water are removed by distillation at 13 hPa (abs.). The quaternary ammonium hydroxide is subsequently deactivated by warming for one hour at 150° C. at 13 hPa (abs.), and the organopolysiloxane is simultaneously separated from the components which boil under these conditions. After cooling to 120° C., the mixture is stirred with activated charcoal and filtered. About 540 g of a yellow, clear oil are obtained. This organopolysiloxane has an amine number (number of ml of 1 N HCl necessary for neutralization of 1 g of the oil) of 4.0 and a viscosity of 404 mm$^2$/s at 25° C. According to the $^1$H NMR spectrum, it contains less than 0.1 percent of methoxy groups.

(b) A solution containing 106 ml of concentrated hydrochloric acid in 830 ml of distilled water is added to a mixture containing 1,780 parts of methyltriethoxysilane and 648 parts of hexamethyldisiloxane. The mixture is stirred at 100° C. for 20 hours, then 1.5 liters of toluene are added, and the aqueous phase is separated off. The toluene phase is stirred for 30 minutes with 30 g of sodium bicarbonate, then filtered and the toluene is subsequently removed by distillation at 100° C. in vacuo. The residue is dried by heating for 1 hour at 120° C. in an oil-pump vacuum.

The resultant branched organopolysiloxane has a viscosity at 23° C. of 50 mm$^2$/s and an OH content of 0.2 percent.

(c) A mixture containing 4 parts of tetra-n-propoxysilane and 1 part of di-n-butyltin diacetate is warmed at 120° C. for 6 hours with stirring. At the same time, the n-propyl acetate produced is continuously removed by distillation. According to the infra-red spectrum, the stretching vibration of the carbonyl group of di-n-butyltin diacetate, which is 1,600 cm-1, has disappeared.

(d) n a 3-neck flask fitted with reflux condenser, thermometer and stirrer, 200 parts of a dimethylpolysiloxane containing one Si-bonded hydroxyl group in each of the terminal units and having a viscosity of 80 mPa.s at 23° C. and 83 parts of N-(2-aminoethyl)-3-aminopropyltrimethoxysilane are mixed with 1.7 parts of 5 percent methanolic potassium hydroxide solution. The mixture is warmed at 140° C. for 3 hours with stirring. The contents of the flask are then cooled to 50° C. and mixed with 1 part of 10 percent aqueous hydrochloric acid, the reflux condenser is replaced by a descending condenser with distillation flask, and the pressure in the apparatus is reduced to 100 hPa (abs.). Finally, the components boiling up to 180° C. at 50 hPa (abs.) are removed from the 3-neck flask by distillation.

The residue is an organopolysiloxane containing silicon-bonded methoxy groups and contains dimethylsiloxane and N-(2-aminoethyl)-3-aminopropylsiloxane units.

(e) About 45 parts of a dimethylpolysiloxane containing one Si-bonded hydroxyl group in each of the terminal units and having a viscosity of 75,000 mPa.s at 23° C. are mixed in the following sequence with 30 parts of the branched organopolysiloxane described in (b) above, 1.5 parts of tri-n-butylphenol polyethylene glycol ether containing 13 ethylene oxide units per molecule, 0.75 parts of the organopolysiloxane described in (d) above and 3 parts of the organopolysiloxane containing amino groups bonded to silicon via carbon, described in (a) above.

About 7.5 parts of methyl-tris-(methylethylketoximo)-silane are stirred into this mixture. The mixture thus obtained is mixed with 60 parts of calcium carbonate whose surface has been coated with stearic acid ("coated chalk"), 7.5 parts of silicon dioxide which has a surface area of 150 m$^2$/g and was produced pyrogenically in the gas phase, and 1.5 parts of the reaction product prepared in (c) above.

(f) The procedure described in (e) above is repeated, except that 75 parts of a dimethylpolysiloxane containing one Si-bonded hydroxyl group in each of the terminal units and having a viscosity of 75,000 mPa.s at 23° C. are substituted for 45 parts of the dimethylpolysiloxane and the addition of the branched organopolysiloxane described in (b) above is omitted.

(g) The procedure described in (e) above is repeated, except that the organopolysiloxane having amino groups bonded to silicon via carbon and described in (a) above is omitted.

(h) The procedure described in (e) above is repeated, except that 60 parts of the dimethylpolysiloxane containing one Si-bonded hydroxyl group in each of the terminal units and having a viscosity of 75,000 mPa.s at 23° C. are substituted for the 45 parts of the dimethylpolysiloxane and instead of 30 parts of the branched organopolysiloxane described in (b) above, 15 parts of a dimethylpolysiloxane which is end-blocked by trimethylsiloxy groups and has a viscosity of 100 mPa.s at 23.C are used.

COMPARISON EXAMPLE 1

(i) The procedure described in 1(e) above is repeated, except that 60 parts of a dimethylpolysiloxane containing one Si-bonded hydroxyl group in each of the terminal units and having a viscosity of 75,000 mPa.s at 23° C. are substituted for the 45 parts of the dimethylpolysiloxane and instead of 30 parts of the branched organopolysiloxane described in (b) above, 15 parts of a dimethylpolysiloxane which is endblocked by trimethylsiloxy groups and has a viscosity of 100 mPa.s at 23° C. are used. The organopolysiloxane containing amino groups bonded to silicon via carbon and described in (a) above, is omitted.

The RTV molding compositions which have been obtained in accordance with Examples 1(e) to 1(h) above or in accordance with Comparison Example 1(i) above, are evacuated to remove the air and transferred into tubes. The molding compositions which have a long shelf life in the absence of water, but crosslink at room temperature in the presence of water to form elastomers, are homogeneous, supple, soft, and sag-resistant. After these sealed tubes have been stored for 24 hours at room temperature, samples are applied in a thick (0 to about 2 mm) layer in a wedge shape, i.e., tapering from about 2 to 0 mm, and crosslinked and stored for a total of 7 days at 23° C. and at a relative humidity of 50 percent in air.

Paint compatibility is tested by applying a coating of a commercially available paint of a high-gloss, medium green standard paint based on an alkyd resin (Glasurit EA high-gloss paint from Messrs. Glasurit GmbH, D-4400 M ster). This test determines if the paint flow is good or poor. The results are shown in Table 1.

The coating adhesion is determined 3 to 4 weeks after the paint has been applied to the elastomer. In determining the adhesion, a square of the applied, hardened paint film having a side length of 2.54 cm is cut, using a razor blade, into 100 squares of equal size having a surface area of 6.45 mm$^2$ each. An adhesive tape is pressed onto the grid, then slowly removed again at an angle of about 30°. The number of small squares remaining on the elastomer during this operation gives the percentage retention of the paint. Retention values of from 95 to 100 percent correspond to excellent adhesion. Retention values of less then 35 percent correspond to inadequate adhesion. The average results of various measurements are reproduced in Table 1.

The mechanical values of the elastomers are in each case determined on 2.0±0.1 mm thick films which are removed from the smooth, flat and degreased substrate on which they are produced after storage for 4 weeks at 23° C. and at a relative humidity in the air of 50 percent. The results are shown in Table 1.

methylammonium hydroxide in methanol is stirred for 1 hour at 80° C. under dry nitrogen.

About 120 parts of distilled water are then added, and the mixture is stirred for an additional 2 hours at 80° C., during which some of the methanol distills off. A vacuum is then applied, and methanol and water are removed by distillation at 13 hPa (abs.). The quaternary ammonium hydroxide is subsequently deactivated by warming for one hour at 150° C. at 13 hPa (abs.), and the organopolysiloxane is simultaneously separated from components which boil under these conditions. After cooling to 120° C., the mixture is stirred with activated charcoal and filtered.

About 715 g of a clear oil are obtained. This organopolysiloxane has an amine number of 2.4 and a viscosity of 1,260 mm$^2$/s at 25° C. According to the IH NMR spectrum, it contains less than 0.1 percent of methoxy groups.

(b) About 250 parts of water are added to a mixture containing 720 parts of dimethyldiethoxysilane, 180 parts of methyltriethoxysilane and 80 parts of trimethylchlorosilane in 500 parts of toluene, and the mixture is stirred for 1 hour at room temperature. The aqueous phase is then separated off, and 50 parts of hexamethyldisiloxane and 1 part of an acid-activated bleaching earth are added to the toluene phase. A vacuum is then applied, and the toluene is removed by distillation by warming to 150° C.

After filtration, a clear liquid having a viscosity of 12 mm$^2$/s at 23° C. and an OH content of 0.06 percent is obtained.

(c) About 30 parts of calcined aluminum silicate, 10 parts of silicon dioxide which has a surface area of 150 m$^2$/g and has been produced pyrogenically in the gas phase, and 1.5 parts of pulverulent sodium aluminum silicate having molecular sieve properties are added to a mixture containing 30 parts of a dimethylpolysiloxane having one Si-bonded hydroxyl group in each of the terminal units and having a viscosity of 75,000 mPa.s at 23° C., 25 parts of a dimethylpolysiloxane containing one Si-bonded hydroxyl group in each of the terminal units and having a viscosity of 20,000 mPa.s at 23° C.

|  | Coating Flow-out | Retention % | Tensile strength N/mm$^2$ | Elongation at break % | Stress at 100% elongation N/mm$^2$ | Shore A Hardness |
| --- | --- | --- | --- | --- | --- | --- |
| Example |  |  |  |  |  |  |
| 1(e) | Very good | 100 | 1.2 | 490 | 0.61 | 40 |
| 1(f) | Good | 0 | 1.8 | 450 | 0.75 | 50 |
| 1(g) | Very good | 0 | 1.4 | 560 | 0.45 | 32 |
| 1(h) | Good | 55 | 1.4 | 460 | 0.63 | 39 |
| Comparison Example |  |  |  |  |  |  |
| 1(i) | Poor | 0 | 1.7 | 520 | 0.51 | 36 |

In all cases, the paint applied to the silicone elastomer dried free of defects, did not discolor and exhibited no wrinkling.

EXAMPLE 2

(a) A mixture containing 522 parts of 3-cyclohexylaminopropyltrimethoxysilane, 592 parts of dimethylpolysiloxane which is end-blocked by trimethylsiloxy groups and contains an average of 10 siloxane units per molecule, and 3 parts of a 25 percent solution of tetraand 30 parts of the branched organopolysiloxane described above in Example 2(b) above. After mixing the fillers to form a homogeneous mixture, 8 parts of methyltri(cyclohexylamino)silane, 2 parts of the organopolysiloxane described in 1(d) above and 6 parts of the organopolysiloxane having amino groups bonded to silicon via carbon and described in 2(a) above are added.

(d) The procedure described in 2(c) is repeated, except that 35 parts of a dimethylpolysiloxane containing one Si-bonded hydroxyl group in each of the terminal units and having a viscosity of 75,000 mPa.s at 23° C., are substituted for the 30 parts of the dimethylpolysiloxane and 35 parts of a dimethylpolysiloxane containing The paint flow-out, the paint adhesion and the mechanical values are determined in accordance with Example 1. The results are shown in Table 2.

TABLE 2

|  | Coating Flow-out | Retention % | Tensile strength N/mm$^2$ | Elongation at break % | Stress at 100% elongation N/mm$^2$ | Shore A Hardness |
|---|---|---|---|---|---|---|
| Example |  |  |  |  |  |  |
| 2(c) | Very good | 45 | 1.1 | 480 | 0.22 | 19 |
| 2(d) | Very good | 5 | 3.1 | 270 | 1.12 | 42 |
| 2(e) | Very good | 0 | 1.9 | 380 | 0.42 | 24 |
| 2(f) | Satisfactory | 30 | 2.4 | 310 | 0.66 | 32 |
| Comparison Example |  |  |  |  |  |  |
| 2(g) | Poor | 0 | 3.1 | 280 | 0.96 | 37 | one Si-bonded hydroxyl group in each of the terminal units and having a viscosity of 20,000 mPa.s at 23° C. are substituted for 25 parts of the dimethylpolysiloxane, and 7 ,parts of silicon dioxide which has a surface area of 150 m$^2$/g and was produced pyrogenically in the gas phase are substituted for the 10 parts of silicon dioxide. Also, the addition of the branched organopolysiloxane described under 2(b) is omitted.

(e) The procedure described under 2(c) is repeated, except that no organopolysiloxane having amino groups bonded to silicon via carbon, whose preparation is described in 2(a) above is used.

(f) The procedure described in 2(c) above is repeated, except that instead of the 30 parts of the branched organopolysiloxane described under 2(b) above, 15 parts of a dimethylpolysiloxane which is end-blocked by trimethylsiloxy groups and has a viscosity of 100 mPa.s at 23° C. are employed. Also, 7 parts of silicon dioxide, which has a surface area of 150 m$^2$/g and was produced pyrogenically in the gas phase, are substituted for the 10 parts of silicon dioxide.

COMPARISON EXAMPLE 2

(g) The procedure described in 2(c) is repeated, except that instead of 30 parts of the branched organopolysiloxane described in 2(b) above, 15 parts of a dimethylpolysiloxane which is end-blocked by trimethylsiloxy groups and has a viscosity of 100 mPa.s at 23° C. are employed and 7 parts of silicon dioxide which has a surface area of 150 m$^2$/g and was produced pyrogenically in the gas phase are substituted for the 10 parts of silicon dioxide. The addition of the organopolysiloxane having amino groups bonded to silicon via carbon and described under 2(a) above is omitted. The RTV molding compositions which have been obtained in accordance with Examples 2(c) to 2(f) or in accordance with the Comparison Example 2(g) above, were evacuated to remove the air and transferred into tubes. The compositions which have a long shelf life in the absence of water, but crosslink at room temperature in the presence of water to form an elastomer, are homogeneous, supple, soft and sag-resistant. After the sealed tubes have been stored at room temperature for 24 hours, samples are applied in a thick (0 to about 2 mm) layer in a wedge shape, i.e., tapering from about 2 to 0 mm; crosslinked and stored for a total of 7 days at 23° C. and at a relative humidity of 50 percent in air.

In all cases, the paint applied to the silicone elastomer dried without defects, did not discolor and exhibited no wrinkling.

EXAMPLE 3

(a) At room temperature, 500 parts of a dimethylpolysiloxane containing one Si-bonded hydroxyl group in each of the terminal units and having a viscosity of 75,000 mPa.s at 23° C. are mixed for about 30 minutes with 15 parts of 3-cyclohexylaminopropyltrimethoxysilane. During the mixing step, the silane reacts with the dimethylpolysiloxane under release of methanol and formulation of a silicon-bonded 3-cyclohexylaminopropyl-dimethoxysiloxy group in each of the terminal units. The siloxane is sensitive to hydrolysis and is stored in a sealed vessel.

(b) About 65 parts of calcium carbonate whose surface has been coated with stearic acid and which has a specific surface area of 20 m$^2$/g are added to a mixture containing 50 parts of the methoxy-terminated dimethylpolysiloxane described in 4(a) above, 30 parts of the branched organopolysiloxane described in Example 1(b), 1.5 parts of tri-n-butylphenol polyethylene glycol ether containing 13 ethylene oxide units per molecule, 3 parts of the organopolysiloxane having amino groups bonded to silicon via carbon and described in Example 1(a) and 1 part of the organopolysiloxane described in Example 1(d) and mixed to form a homogeneous mixture. About 1 part of zinc octanoate, then 10 parts of tetraethyl silicate and finally 1 part of tetra-ipropyl titanate are then added, and then mixed in vacuo to form a homogeneous mixture.

(c) The procedure described in 4(b) is repeated, except that 65 parts are substituted for 50 parts of the methoxyterminated organopolysiloxane described in 4(a), and the addition of the branched organopolysiloxane described in Example 1(b) is omitted.

(d) The procedure described in 4(b) is repeated, except that the organopolysiloxane having amino groups bonded to silicon via carbon and whose preparation is described in Example 1(a) is omitted.

(e) The procedure described under 4(b) is repeated, except that 15 parts of a dimethylpolysiloxane which is endblocked by trimethylsiloxy groups and has a viscosity of 100 mPa.s at 23° C. are substituted for the 30 parts of the branched organopolysiloxane described in Example 1(b).

COMPARISON EXAMPLE 3

(f) The procedure described in 3(b) above is repeated, except that instead of 30 parts of the branched organopolysiloxane described in Example 1(b) above, 15 parts of a dimethylpolysiloxane which is end-blocked by trimethylsiloxy groups and has a viscosity of 100 mPa.s at 23° C. are used and the addition of the organopolysiloxane having amino groups bonded to silicon via carbon and described in Example 1(a) is omitted.

The RTV molding compositions which have been obtained in accordance with Examples 3(b) to 3(e) or in accordance with Comparison Example 3(f), were evacuated to remove the air and transferred into tubes. These compositions which have a long shelf life in the absence of water, but crosslink at room temperature in the presence of water to form an elastomer, are homogeneous, supple, soft and sag-resistant. After the sealed tubes have been stored at room temperature for 24 hours, samples are applied in a thick (0 to about 2 mm) layer in a wedge shape, i.e., tapering from about 2 to 0 mm, and crosslinked and stored for a total of 7 days at 23° C. at a relative humidity of 50 percent in air.

The coating flow-out, the coating adhesion and the mechanical values are determined in accordance with Example 1. The results are shown in Table 3.

TABLE 3

|  | Coating Flow-out | Retention % | Tensile strength N/mm² | Elongation at break % | Stress at 100% elongation N/mm² | Shore A Hardness |
|---|---|---|---|---|---|---|
| Example |  |  |  |  |  |  |
| 3(b) | Very good | 45 | 2.0 | 720 | 0.46 | 31 |
| 3(c) | Good | 60 | 2.1 | 570 | 0.66 | 44 |
| 3(d) | Very good | 0 | 2.3 | 510 | 0.56 | 35 |
| 3(e) | Good | 0 | 2.5 | 460 | 0.71 | 40 |
| Comparison Example |  |  |  |  |  |  |
| 3(f) | Poor | 0 | 2.8 | 330 | 1.0 | 47 |

In all cases, the coating applied to the silicone elastomer dried free of defects, did not discolor and exhibited no wrinkling.

EXAMPLE 4

(a) About 19 parts of hexamethyldisilazane and 7 parts of water are added to 100 parts of a dimethylpolysiloxane containing one vinyl group in each of the terminal units and having a viscosity of 20,000 mPa.s at 23° C. in a trough kneader under nitrogen, and the mixture is mixed in the kneader for 15 minutes at room temperature until it becomes homogeneous. About 63 parts of a silicon dioxide which has a specific surface area of 300 m²/ g and was produced pyrogenically in the gas phase are subsequently incorporated therein. The mixture is kneaded for 1 hour at room temperature and then for 2 hours at 100° C. The pressure in the kneader is then reduced to 80 hPa (abs.) by removing the gaseous contents from the kneader by vacuum, and the contents remaining are warmed to 140° C. and kneaded at this temperature for 2 hours. After cooling to room temperature, and airating 100 parts of the resultant mixture are diluted with 30 parts of the dimethylpolysiloxane containing one vinyl group in each of the terminal units and having a viscosity of 20,000 mPa.s at 23° C.

(b) In a planetary mixer, 75 parts of the mixture whose preparation is described in Example 4(a), are mixed with 16.5 parts of tetra-i-butoxysilane, then with 6 parts of N-(2-aminoethyl)-3-aminopropyltriethoxysilane and finally with 2.5 parts of the reaction product whose preparation is described in Example 1(c), at room temperature and under the pressure of the ambient atmosphere. Finally, gaseous components of the composition, which form bubbles in the composition, are removed by reducing the pressure in the kneader.

A homogeneous, supple, soft and sag-resistant paste is obtained.

(c) In a planetary mixer, 60 parts of a dimethylpolysiloxane containing one Si-bonded hydroxyl group in each of the terminal units and having a viscosity of 75,000 mPa.s at 23° C. are mixed with 2 parts of tri-n-butylphenol polyethylene glycol ether containing 13 ethylene oxide units per molecule, and 6 parts of the organopolysiloxane having amino groups bonded to silicon via carbon and described in Example 1(a), and then with 90 parts of calcium carbonate whose surface has been coated with stearic acid and has a specific surface area of 20 m²/ g. About 40 parts of the branched organopolysiloxane described in Example 2(b) are subsequently added, and the composition is mixed in vacuo until homogeneous.

(d) The procedure described in Example 4(c) is repeated, except that instead of 60 parts of a dimethylpolysiloxane containing one Si-bonded hydroxyl group in each of the terminal units and having a viscosity of 75,000 mPa.s at 23° C., 80 parts are employed, and the addition of the branched organopolysiloxane described in Example 2(b) is omitted.

(e) The procedure described in Example 4(c) is repeated, except that the organopolysiloxane having amino groups bonded to silicon via carbon and whose preparation is described in Example 1(a) is omitted.

(f) The procedure described under Example 4(c) is repeated, except that instead of 40 parts of the branched organopolysiloxane described in Example 2(b), 20 parts of a dimethylpolysiloxane which is end-blocked by trimethylsiloxy groups and has a viscosity of 100 mPa.s at 23° C. are used.

COMPARISON EXAMPLE 4

(g) The procedure described in 4(c) is repeated, except that instead of 40 parts of the branched organopolysiloxane described in Example 2(b), 20 parts of a dimethylpolysiloxane which is end-blocked by trimethylsiloxy groups and has a viscosity of 100 mPa.s at 23° C. are used, and the addition of the organopolysiloxane having amino groups bonded to silicon via carbon and described in Example 1(a) is omitted.

About 100 parts each of the mixtures, described in Examples 4(c) to 4(f) or in Comparison Example 4(g), and which are, without exception, homogeneous, supple, soft and sag-resistant, are mixed with 10 parts of the paste whose preparation is described in Example 4(b). These mixtures vulcanize to form elastomers, which are tested in accordance with Example 1. The results are shown in Table 4.

TABLE 4

Paint compatibility and mechanical values of the elastomers prepared by adding 10 parts of the curing agent paste described in example 4(b) to 100 parts of the basic compositions described in examples 4(c) to 4(f) or the comparison example 4(g) above are determined.

| | Coating Flow-out | Retention % | Tensile strength N/mm$^2$ | Elongation at break % | Stress at 100% elongation N/mm$^2$ | Shore A Hardness |
|---|---|---|---|---|---|---|
| Example | | | | | | |
| 4(c) | Good | 100 | 2.0 | 930 | 0.31 | 23 |
| 4(d) | Poor | 100 | 2.7 | 480 | 1.00 | 51 |
| 4(e) | Good | 0 | 2.8 | 1020 | 0.36 | 22 |
| 4(f) | Poor | 100 | 2.4 | 800 | 0.46 | 32 |
| Comparison Example | | | | | | |
| 4(g) | Poor | 0 | 1.8 | 470 | 0.58 | 29 |

In all cases, the coating applied to the silicone elastomer dried without defects, did not discolor and exhibited no wrinkling.

A comparison of the results shown in Tables 1 to 4 shows that the combination of organopolysiloxane (3), employed according to this invention, containing SiC-bonded organic radicals and having a basic nitrogen with a branched organopolysiloxane (4) produces particularly desirable results with respect to paint compatibility and overcoatability [Examples 1(e), 2(c), 3(b) and 4(c)].

Although it is possible to improve the paint compatibility and overcoatability of mixtures which contain the organopolysiloxane (3) having SiC-bonded organic radicals with a basic nitrogen but do not contain branched organopolysiloxane (4), these mixtures are, however, viscous, putty-like and are consequently difficult to extrude. In addition, the vulcanized materials have a high modulus [Examples 1(f), 2(d), 3(c) and 4(d)]

Although it is possible to improve these properties by adding linear organopolysiloxanes containing terminal trimethylsiloxy groups instead of the branched organopolysiloxane (4), the coating adhesion is not improved, and in some cases it is significantly impaired [Examples 1(h), 2(f), 3(e) and 4(f)].

Although the coating flow-out substantially improves when the branched organopolysiloxanes of this invention are used instead of linear organopolysiloxanes containing terminal trimethylsiloxy groups; however, in the absence of the organopolysiloxanes (3) containing SiC-bonded organic radicals having a basic nitrogen, the paint does not, adhere to the sealant [Examples 1(g), 2(e), 3(d) and 4(e)]

Finally, Comparison Examples 1(i), 2(g), 3(f) and 4(g) show that mixtures which do not contain organopolypolysiloxanes (3) of this invention, having SiC-bonded organic radicals with a basic nitrogen and branched organopolysiloxanes (4) of this invention, are not paintcompatible. In addition, these examples show that the amine oils of U.S. Pat. No. 4,191,817, which are prepared in accordance with I(d), do not cause any improvement in the paint compatibility.

What is claimed is:

1. A composition which is crosslinkable at room temperature to form an elastomer which comprises a crosslinkable diorganopolysiloxane (1) and an organopolysiloxane selected from the group consisting of (a) an organopolysiloxane (3) which contains SiC-bonded organic radicals having a basic nitrogen and which is obtained by reacting, in a first step, a compound selected from the group consisting of a silane of the formula $$YSiR_x(OR^1)_{3-x},$$

in which R is selected from the group consisting of a monovalent hydrocarbon radical and a substituted monovalent hydrocarbon radical having from 1 to 18 carbon atoms per radical, $R^1$ is an alkyl radical having from 1 to 4 carbon atoms per radical, Y is a monovalent SiC-bonded organic radical having a basic nitrogen, and x is 0 or 1, a partial hydrolyzate thereof, and mixtures thereof with an organopolysiloxane of the formula $$R_3SiO(SiR_2O)_nSiR_3,$$

in which R is the same as above and n is 0 or an integer having a value of from 1 to 100, in an amount of from 0.1 to 10 parts by weight per part by weight of the total amount of the silane having the above formula and the partial hydrolyzate thereof in the presence of a basic catalyst and in the absence of water, and in a second step, the organopolysiloxane obtained in the first step, is reacted with water in order to hydrolyze groups of the formula $$-OR^1,$$

in which $R^1$ is the same as above, simultaneously or subsequently condensing the silanol groups formed during this hydrolysis with one another, and the product formed during this reaction is separated from alkanol and water, (b) a branched organopolysiloxane (4) which comprises 0 to 50 mol percent of $R_3SiO_{\frac{1}{2}}$ units, 0 to 80 mol percent of $R_2SiO$ units, 10 to 60 mol percent of $RSiO_{3/2}$ units, and 0 to 10 mol percent of $SiO_2$ units, where R is the same as above, and where the branched organopolysiloxane contains 0 to 10 mol percent of SiOC-bonded groups of the formula $-OR^2$, in which $R^2$ is selected from the group consisting of a monovalent hydrocarbon radical having from 1 to 8 carbon atoms per radical and a monovalent hydrocarbon radical substituted by an alkoxy group, and a maximum of 0.5 mol percent of Si-bonded hydroxyl groups, and (c) mixtures of (3) and (4).

2. The composition of claim 1, wherein the crosslinkable diorganopolysiloxane (1) contains end groups which are capable of condensation, and, also contains a silicon compound (2) having a total of at least three groups per molecule selected from the group consisting of amino groups bonded to silicon via nitrogen, oxime groups bonded to silicon via oxygen, hydrocarbonoxy groups bonded to silicon via oxygen, substituted hydrocarbonoxy groups bonded to silicon via oxygen, and mixtures thereof.

3. The composition of claim 1, wherein the crosslinkable diorganopolysiloxane (1) is obtained by mixing a diorganopolysiloxane containing end groups which are capable of condensation with a silicon compound (2) having a total of at least three groups per molecule selected from the group consisting of amino groups bonded to silicon via nitrogen, oxime groups bonded to silicon via oxygen, hydrocarbonoxy groups bonded to silicon via oxygen, substituted hydrocarbonoxy groups bonded to silicon via oxygen, and mixtures thereof.

4. The composition of claim 1, wherein the diorganopolysiloxane (1) is a diorgaopolysiloxane of the formula $$HO(SiR^3{}_2O)_mH \quad (1)$$

where $R^3$ is selected from the group consisting of a monovalent hydrocarbon radical and a substituted monovalent hydrocarbon radical having from 1 to 18 carbon atoms per radical, and m is an integer having a value of at least 10.

5. The composition of claim 2, wherein the diorganopolysiloxane (1) is a diorganopolysiloxane of the formula $$HO(SiR^3{}_2O)_mH \qquad (1)$$

where $R^3$ is selected from the group consisting of a monovalent hydrocarbon radical and a substituted monovalent hydrocarbon radical having from 1 to 18 carbon atoms per radical, and m is an integer having a value of at least 10.

6. The composition of claim 3, wherein the diorganopolysiloxane (1) is a diorganopolysiloxane of the formula $$HO(SiR^3{}_2O)_mH \qquad (1)$$

where R3 is selected from the group consisting of a monovalent hydrocarbon radical and a substituted monovalent hydrocarbon radical having from 1 to 18 carbon atoms per radical, and m is an integer having a value of at least 10.

7. The composition of claim 3, wherein the silicon compound (2) is a compound of the formula $$R^3{}_aSiZ_{4-a} \quad TM(2.)$$

where $R^3$ is selected from the group consisting of a monovalent hydrocarbon radical and a substituted monovalent hydrocarbon radical having from 1 to 18 carbon atoms per radical, a is 0 or 1, and Z is a hydrolyzable group selected from the group consisting of amino groups (—NR$^4{}_2$), oxime groups (—ON=CR$^4{}_2$), hydrocarbonoxy groups (—OR$^2$), mixtures and partial hydrolyzates thereof containing 2 to 10 silicon atoms per molecule, where R$^4$ is selected from the group consisting of hydrogen, a monovalent hydrocarbon radical and a substituted monovalent hydrocarbon radical having from 1 to 18 carbon atoms per radical, and R$^2$ is selected from the group consisting of a monovalent hydrocarbon radical having from 1 to 8 carbon atoms per radical and a monovalent hydrocarbon radical substituted by an alkoxy group.

8. The composition of claim 1, wherein the crosslinkable diorganopolysiloxane (1) is obtained by mixing a diorganopolysiloxane containing end groups which are capable of condensation with a silicon compound (2) of the formula $$R^5Si(OR^2)_3, \quad TM\ 2(b)$$

where $R^2$ is selected from the group consisting of a monovalent hydrocarbon radical having from 1 to 8 carbon atoms and a monovalent hydrocarbon radical substituted by an alkoxy group and $R^5$ is selected from the group consisting of amino, mercapto, morpholino, glycidoxy, acryloxy and methacryloxy groups bonded to the silicon atom via C$_2$- to C$_6$-alkylene radicals, where the amino and mercapto groups may be substituted by C$_1$ to C$_6$-alkyl, cycloalkyl, aminoalkyl and mercaptoalkyl groups, and partial hydrolyzates thereof having from 2 to 10 silicon atoms per molecule.

9. The composition of claim 1, wherein the crosslinkable diorganopolysiloxane (1) is obtained by mixing a diorganopolysiloxane containing end groups which are capable of condensation with a silicon compound (2) of the formula

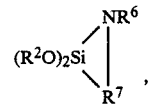

where $R^2$ is selected from the group consisting of a monovalent hydrocarbon radical having from 1 to 8 carbon atoms per radical and a monovalent hydrocarbon radical substituted by an alkoxy group, $R^6$ is selected from the group consisting of a hydrogen atom, an alkyl, cycloalkyl, aminoalkyl and mercaptoalkyl group, having in each case 1 to 6 carbon atoms, and $R^7$ is a divalent aliphatic hydrocarbon radical having from 1 to 10 carbon atoms per radical.

10. A two-component composition which is crosslinkable at room temperature to form an elastomer which comprises component (A), which contains a crosslinkable diorganopolyxiloxane (1) having end groups which are capable of condensation, an organopolysiloxane selected from the group consisting of (a) an organopolysiloxane (3) which contains SiC-bonded organic radicals having a basic nitrogen and which is obtained by reacting, in a first step, a compound selected from the group consisting of a silane of the formula $$YSiR_x(OR^1)_{3-x},$$

in which R is selected from the group consisting of a monovalent hydrocarbon radical and a substituted monovalent hydrocarbon radical having from 1 to 18 carbon atoms per radical, R$^1$ is an alkyl radical having from 1 to 4 carbon atoms per radical, Y is a monovalent SiC-bonded organic radical having a basic nitrogen, and x is 0 or 1, a partial hydrolyzate thereof and mixtures thereof with an organopolysiloxane of the formula $$R_3SiO(SiR_2O)_nSiR_3,$$

in which R is the same as above and n is 0 or an integer having a value of from 1 to 100, in an amount of from 0.1 to 10 parts by weight per part by weight of the total amount of the silane having the above formula and the partial hydrolyzate thereof in the presence of a basic catalyst and in the absence of water, and in a second step, the organopolysiloxane obtained in the first step, is reacted with water in order to hydrolyze groups of the formula $$-OR^1,$$

in which $R^1$ is the same as above, simultaneously or subsequently condensing the silanol groups formed during this hydrolysis with one another, and the product formed during this reaction is separated from alkanol and water, (b) a branched organopolysiloxane (4) which comprises 0 to 50 mol percent of $R_3SiO_{\frac{1}{2}}$ units, 0 to 80 mol percent of $R_2SiO$ units, 10 to 60 mol percent of $RSiO_{3/2}$ units, and 0 to 10 mol percent of $SiO_2$ units, where R is the same as above, and where the branched organopolysiloxane contains 0 to 10 mol percent of SiOC-bonded groups of the formula $-OR^2$, in which $R^2$ is selected from the group consisting of a monovalent hydrocarbon radical having from 1 to 8 carbon atoms per radical and a monovalent hydrocarbon radical substituted by an alkoxy group, and a maximum of 0.5 mol percent of Si-bonded hydroxyl groups, and (c) mixtures of (3) and (4) and component (B) which contains as a crosslinking agent, a silicon compound (2) selected from the group consisting of a compound of the formula $$R^3{}_aSi(OR^2)_{4-a} \qquad (2d)$$

and oligomers thereof, where $R^2$ is selected from the group consisting of a monovalent hydrocarbon radical having from 1 to 8 carbon atoms per radical and a monovalent hydrocarbon radical substituted by an alkoxy group, $R^3$ is selected from the group consisting of a monovalent hydrocarbon radical and a substituted monovalent hydrocarbon radical having from 1 to 18 carbon atoms per radical, and a is 0 or 1.

11. The composition of claim 10, wherein the crosslinkable diorganopolysiloxane (1) is a compound of the formula $$HO(SiR^3{}_2O)_mH \qquad (1)$$

where $R^3$ is selected from the group consisting of a monovalent hydrocarbon radical and a substituted monovalent hydrocarbon radical having from 1 to 18 carbon atoms per radical and m is an integer having a value of at least 10.

12. A process for preparing a composition which is crosslinkable at room temperature to form a paintable elastomer which comprises adding to a crosslinkable diorganopolysiloxane (1), an organopolysiloxane selected from the group consisting of (a) an organopolysiloxane (3) which contains SiC-bonded organic radicals having a basic nitrogen and which is obtained by reacting, in a first step, a compound selected from the group consisting of a silane of the formula $$YSiR_x(OR^1)_{3-x},$$

in which R is selected from the group consisting of a monovalent hydrocarbon radical and a substituted monovalent hydrocarbon radical having from 1 to 18 carbon atoms per radical, $R^1$ is an alkyl radical having from 1 to 4 carbon atoms per radical, Y is a monovalent, SiC-bonded organic radical having a basic nitrogen, and x is 0 or 1, a partial hydrolyzate thereof, and mixtures thereof with an organopolysiloxane of the formula $$R_3SiO(SiR_2O)_nSiR_3,$$

in which R is the same as above and n is 0 or an integer having a value of from 1 to 100, in an amount of from 0.1 to 10 parts by weight per part by weight of the total amount of silane having the above formula and the partial hydrolyzate thereof in the presence of a basic catalyst and in the absence of water, and in a second step, the organopolysiloxane obtained in the first step is reacted with water in order to hydrolyze groups of the formula $$-OR^1,$$

in which $R^1$ is the same as above, simultaneously or subsequently condensing the silanol groups formed during the hydrolysis with one another, and the product formed during this reaction is separated from alkanol and water, (b) a branched organopolysiloxane (4) which comprises 0 to 50 mol percent of $R_3SiO_{\frac{1}{2}}$ units, 0 to 80 mol percent of $R_2SiO$ units, 10 to 60 mol percent of $RSiO_{3/2}$ units, and 0 to 10 mol percent of $SiO_2$ units, where R is the same as above, and where the branched organopolysiloxane contains 0 to 10 mol percent of SiOC-bonded groups of the formula $-OR^2$ in which $R^2$ is selected from the group consisting of a monovalent hydrocarbon radical having from 1 to 8 carbon atoms per radical and a monovalent hydrocarbon radical substituted by an alkoxy group, and a maximum of 0.5 mol percent of Si-bonded hydroxyl groups, and (c) mixtures of (3) and (4).

13. The process of claim 12, wherein mixtures of organopolysiloxanes (3) and (4) are added to the crosslinkable compositions.

14. A paintable elastomer which is obtained by crosslinking the composition obtained from the process of claim 12 containing a diorganopolysiloxane (1) that is crosslinked by a condensation reaction and organopolysiloxanes (3) and (4).

15. A paintable elastomer which is obtained by crosslinking the composition obtained from the process of claim 12 containing a diorganopolysiloxane (1) that is crosslinked by a condensation reaction and organopolysiloxane (3).

16. A paintable elastomer which is obtained by crosslinking the composition obtained from the process of claim 12 containing a diorganopolysiloxane (1) that is crosslinked by a condensation reaction and organopolysiloxane (4).

* * * * *